US012003691B1

United States Patent
Oh et al.

(10) Patent No.: US 12,003,691 B1
(45) Date of Patent: Jun. 4, 2024

(54) CAMERA FOCUS ADJUSTMENT

(71) Applicant: Microsoft Technology Licensing, LLC, Redmond, WA (US)

(72) Inventors: Minseok Oh, Santa Clara, CA (US); Rui Jin, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/310,825

(22) Filed: May 2, 2023

(51) Int. Cl.
*G09G 5/00* (2006.01)
*G02B 27/00* (2006.01)
*G02B 27/01* (2006.01)
*H04N 13/128* (2018.01)
*H04N 23/11* (2023.01)
*H04N 23/20* (2023.01)

(52) U.S. Cl.
CPC ....... *H04N 13/128* (2018.05); *G02B 27/0093* (2013.01); *G02B 27/0172* (2013.01); *H04N 23/11* (2023.01); *H04N 23/20* (2023.01); *G02B 2027/0138* (2013.01); *G02B 2027/014* (2013.01)

(58) Field of Classification Search
CPC ............ G02B 27/0093; G02B 27/0172; G02B 2027/0138; G02B 2027/014; H04N 13/128; H04N 23/11; H04N 23/20
See application file for complete search history.

(56) References Cited

U.S. PATENT DOCUMENTS

| 9,066,087 | B2* | 6/2015 | Shpunt | G01B 11/25 |
| 9,445,073 | B2* | 9/2016 | Chu | G06F 3/0488 |
| 10,212,408 | B1* | 2/2019 | Pappas-Katsiafas | H04N 13/156 |
| 10,237,530 | B1* | 3/2019 | Brailovskiy | H04N 13/128 |
| 10,587,858 | B2* | 3/2020 | Zolotov | H04N 13/20 |
| 10,595,007 | B2* | 3/2020 | Wu | G01S 17/894 |
| 11,205,278 | B2* | 12/2021 | Kang | G06T 7/194 |
| 11,222,237 | B2* | 1/2022 | Taniai | G06N 3/084 |
| 2009/0167930 | A1* | 7/2009 | Safaee-Rad | G03B 13/36 348/347 |
| 2011/0025827 | A1* | 2/2011 | Shpunt | H04N 5/33 348/46 |
| 2011/0285825 | A1* | 11/2011 | Tian | G06T 5/90 348/47 |
| 2014/0111623 | A1* | 4/2014 | Zhao | H04N 13/128 348/47 |
| 2019/0058859 | A1* | 2/2019 | Price | H04N 13/271 |

* cited by examiner

Primary Examiner — Joe H Cheng
(74) Attorney, Agent, or Firm — Alleman Hall & Tuttle LLP

(57) ABSTRACT

A method for camera focus adjustment includes, at a computing system, receiving a depth image of a surrounding environment captured by a depth camera of the computing system. The depth image includes a plurality of depth pixels each encoding depth values corresponding to distances between the depth camera and objects in the surrounding environment. One or more depth pixels of the plurality of depth pixels are identified as a region of interest (ROI). Based on the depth values of the one or more depth pixels, a focus of an environmental imaging camera of the computing system is adjusted.

20 Claims, 10 Drawing Sheets

300

```
┌─────────────────────────────────────────────────────────────────┐
│  RECEIVE A DEPTH IMAGE OF A SURROUNDING ENVIRONMENT CAPTURED BY A │
│                          DEPTH CAMERA                             │
│                                                            302    │
└─────────────────────────────────────────────────────────────────┘
                                  ↓
┌─────────────────────────────────────────────────────────────────┐
│   IDENTIFY ONE OR MORE DEPTH PIXELS AS A REGION-OF-INTEREST (ROI) │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│              DETECT GAZE VECTOR OF HUMAN USER                    │
│   │                                                      306  │  │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│      DETECT OBJECT OF INTEREST IN ENVIRONMENTAL IMAGE OF         │
│   │  SURROUNDING ENVIRONMENT CAPTURED BY ENVIRONMENTAL         │  │
│                       IMAGING CAMERA                             │
│   │                                                      308  │  │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
│                                                            304    │
└─────────────────────────────────────────────────────────────────┘
                                  ↓
┌─────────────────────────────────────────────────────────────────┐
│ ADJUST A FOCUS OF AN ENVIRONMENTAL IMAGING CAMERA BASED AT LEAST │
│     IN PART ON DEPTH VALUES OF THE ONE OR MORE DEPTH PIXELS      │
│                                                            310    │
└─────────────────────────────────────────────────────────────────┘
                                  ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
     DISPLAY ENVIRONMENTAL IMAGE CAPTURED AFTER FOCUS ADJUSTMENT
│                                                            312  │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 3

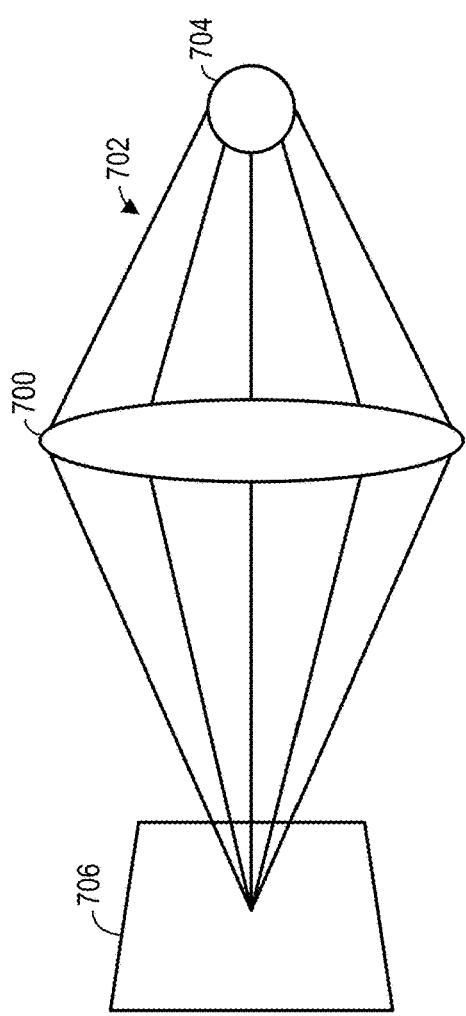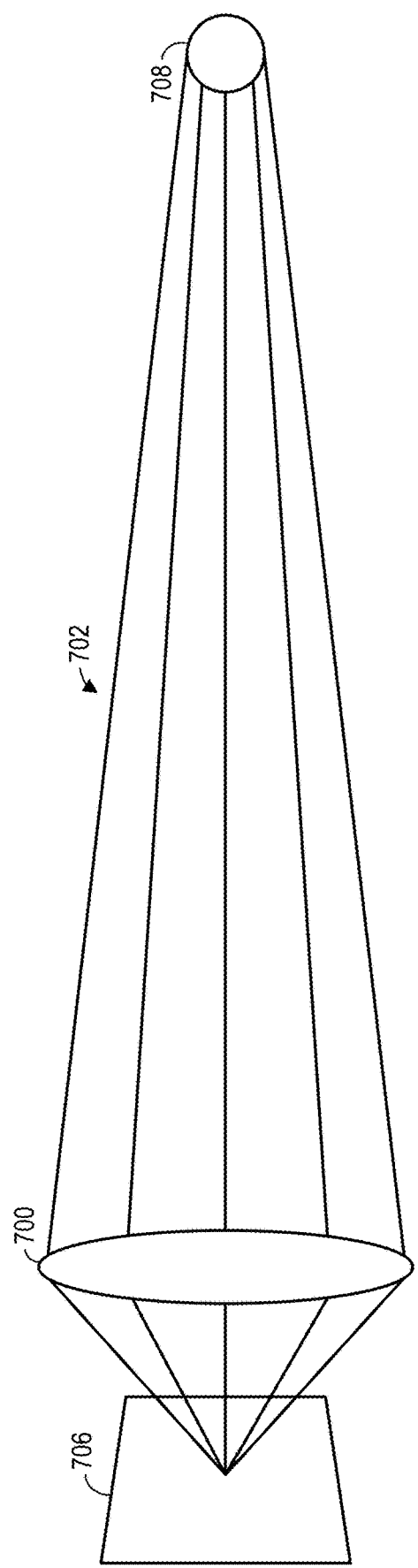
FIG. 7A
FIG. 7B

800

```
RECEIVE ENVIRONMENTAL IMAGE CAPTURED WHILE THE
ENVIRONMENTAL IMAGING CAMERA IS SET TO A FIRST FOCUS LEVEL
FOR A FIRST ROI
                                                      802
```

↓

```
DEBLUR A PORTION OF THE ENVIRONMENTAL IMAGE CORRESPONDING
TO A SECOND ROI
                                                      804
```

↓

```
DISPLAY THE ENVIRONMENTAL IMAGE
                                                      806
```

FIG. 8

CAMERA FOCUS ADJUSTMENT

BACKGROUND

Camera autofocus mechanisms are used to automatically adjust a camera lens to focus light originating from a particular object or region onto an image sensor. The lens is adjustable to a range of different positions, corresponding to different focus levels, depending on the distance between the camera and the focus target. Autofocus mechanisms often employ one or both of contrast detection and phase detection to determine the requisite focus level for focusing on a particular target.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The present disclosure is generally directed to techniques for adjusting the focus of a camera. In some examples, the techniques described herein are used for imaging relatively low-light environments in which autofocus performance is compromised. Specifically, a computing system receives a depth image of a surrounding environment captured by a depth camera. One or more depth pixels of the depth image are identified as corresponding to a region-of-interest (ROI)—e.g., by tracking the current gaze vector of a human user, and/or by performing object detection. Based on depth values for the one or more depth pixels, the focus of an environmental imaging camera is adjusted to focus on a portion of the surrounding environment imaged by the ROI.

BRIEF DESCRIPTION OF THE DRAWINGS

FIG. 3 illustrates an example method for camera focus adjustment.

FIGS. 7A and 7B schematically illustrate camera lens focus adjustment.

FIG. 8 illustrates an example method for camera focus adjustment in which two ROIs are detected.

DETAILED DESCRIPTION

Figure 1:
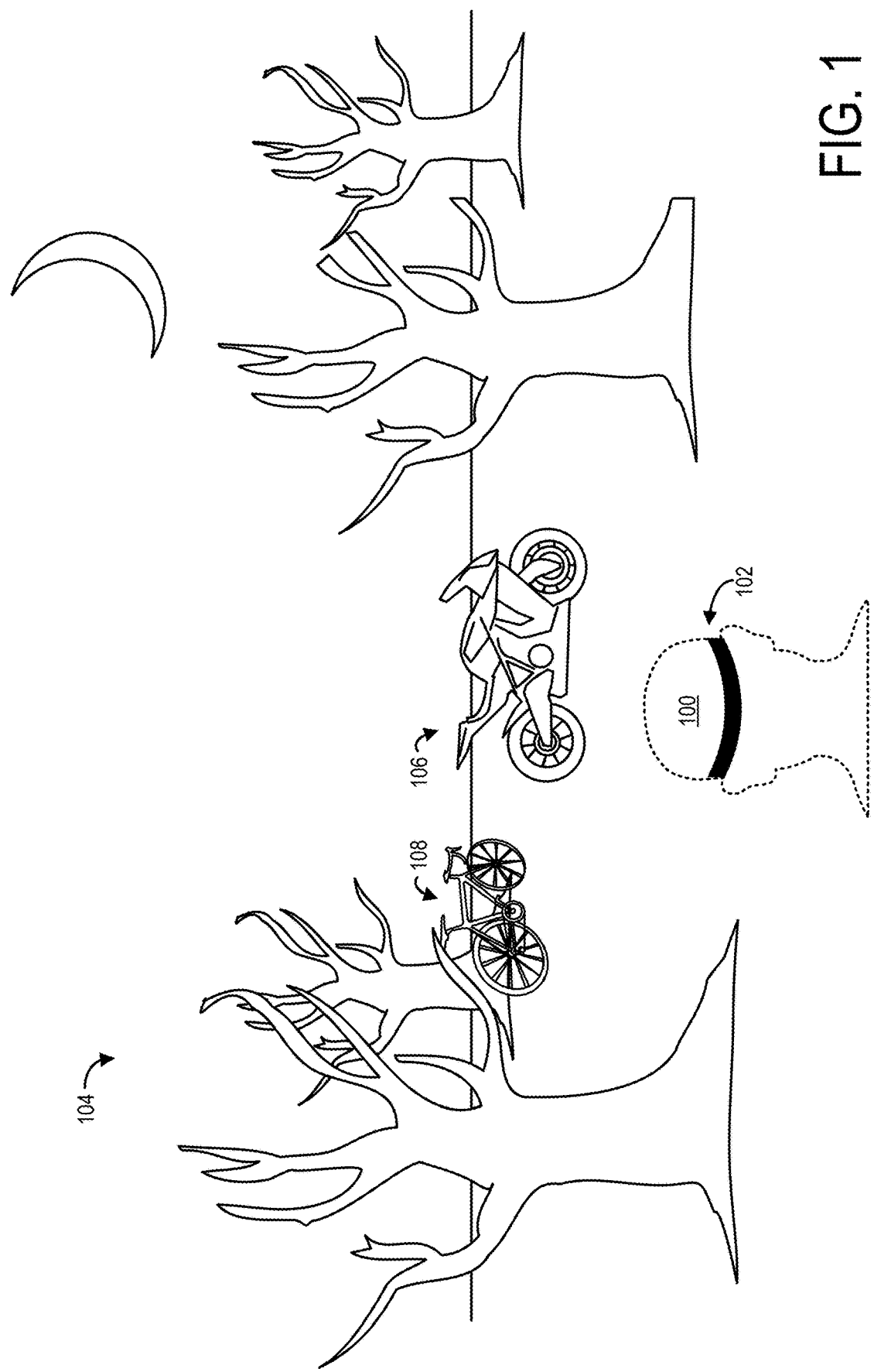
FIG. 1 schematically illustrates use of a computing system in an example environment.

As discussed above, camera autofocus systems are useable to automatically adjust a camera's focus level to focus on a particular target in a surrounding environment. However, the performance of autofocus systems is typically unsatisfactory in low-light environments—e.g., because image data detected at the image sensor has insufficient contrast for identifying a focus target.

While a user could adjust the camera focus manually, this process is slow and cumbersome, and would not be possible in cases where a human user is not present (e.g., when the camera is a component of an autonomous vehicle or robot). Alternatively, while autofocus performance could be improved by providing additional illumination light, such illumination light may be visible to one or more other parties in the environment—e.g., humans, animals, and/or photosensitive devices. This may be undesirable in some scenarios. For example, illumination light can be distracting or uncomfortable to potential observers—e.g., when the illumination light source emits relatively bright visible light toward a person's eyes. As another example, in some scenarios (e.g., gaming, hunting, law-enforcement), it may be desirable to control the emission of illumination light to reduce or eliminate the chance that it is visible to other parties—e.g., to maintain a covert presence.

Accordingly, the present disclosure is directed to techniques for camera focus adjustment, which may beneficially be used in low-light environments. In some examples, the techniques described herein are implemented as part of a night vision system or other computerized vision augmentation system, enabling the capture of focused images in low-light environments.

Specifically, according to the techniques described herein, a computing system includes a depth camera and an environmental imaging camera. For example, the environmental imaging camera may be a visible light camera configured for use in low-light environments, or an infrared light camera. The computing system receives a depth image of a surrounding environment captured by the depth camera, where depth pixels of the depth image encode depth values representing distances between the depth camera and objects in the environment. One or more such depth pixels are identified as a region-of-interest (ROI)—e.g., by tracking a gaze direction of a human user, and/or by detecting presence of an object of interest in the environment. The focus of the environmental imaging camera is then adjusted based on the depth values corresponding to the ROI, such that images captured by the environmental imaging camera are focused on the portion of the surrounding environment imaged by the ROI in the depth image. In some examples, images captured by the environmental imaging camera are then displayed—e.g., via a near-eye display of a head-mounted display device (HMD)—enabling a human user to see objects corresponding to the ROI more clearly than would be the case if the focus is not adjusted.

In this manner, the techniques described herein beneficially improve the ability of a camera system to capture images focused on objects of interest in an environment, without requiring use of additional visible-light illumination sources, such as a camera flash. The techniques described herein therefore provide a technical benefit of reducing consumption of computing resources—e.g., reducing consumption of electrical power to conserve battery life. As another example, the techniques described herein provide a technical benefit of reducing the burden of user input to a computing device—e.g., by reducing the manual effort required by a user to focus a camera while capturing images of their surrounding environment.

FIG. 1 schematically shows a user 100 using an example computing system 102 in an environment 104. In this example, the computing system is implemented in a wearable assembly configured to be worn on the head of user 100—e.g., as an HMD. Specifically, in this example, the computing system is implemented as a night vision system, or other computerized vision augmentation system. However, it will be understood that this is non-limiting. As another non-limiting example, the techniques described herein may be implemented by a vehicle computing system or autonomous robot. In general, the techniques described herein may be implemented by a computing system of one or more computing devices, which includes or interfaces with one or more cameras (e.g., a depth camera and environmental imaging camera). It will be understood that any computing device implementing the techniques described herein may have any suitable capabilities, hardware configuration, and form factor.

More particularly, the camera focus adjustment techniques are described herein as being performed by a logic machine of a computing system. In some cases, the logic machine is integrated into a same housing as the cameras used to image the surrounding environment—e.g., the entire computing system may take the form of a portable device that can be carried or worn by a user. In other cases, components of the computing system are distributed between multiple separate devices. For example, the logic machine may be disposed within a device that is physically separate from the cameras used to image the environment, while still controlling operation of the cameras via a suitable wired or wireless connection. In some cases, the computing system is implemented as computing system 1000 described below with respect to FIG. 10.

In the example of FIG. 1, environment 104 is an outdoor environment at night. Although objects in FIG. 1 are shown as being fully visible, this is done only for the sake of visual clarity, and it will be understood that FIG. 1 represents a scenario with relatively low visibility. As such, user 100 is making use of computing system 102 to improve their ability to see the surrounding environment—e.g., enabling the user to see example objects 106 (a motorcycle) and/or 108 (a bicycle), which would otherwise be at least partially obscured from the user's perspective. As will be described in more detail below, this includes adjusting the focus of an environmental imaging camera used to capture images of the surrounding environment, based at least in part on a depth image captured by a depth camera.

Figure 2:
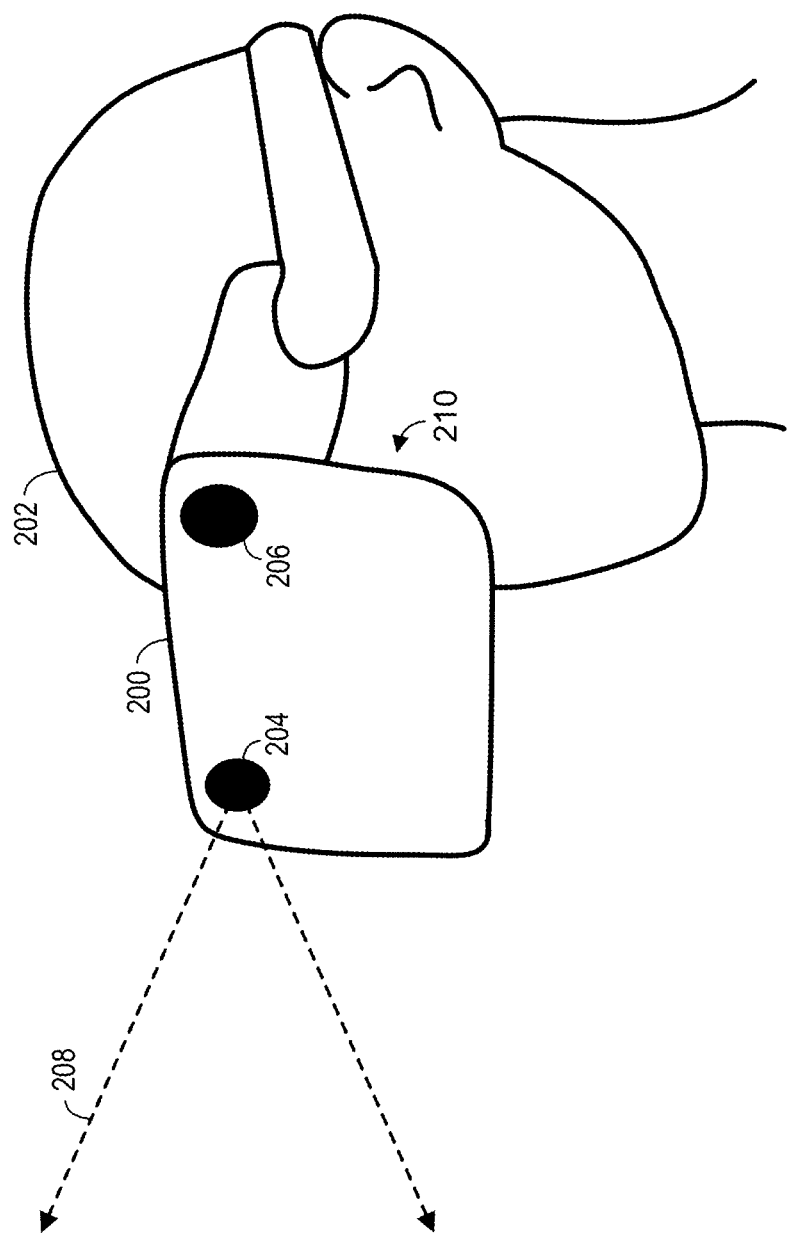
FIG. 2 schematically shows an example HMD including a depth camera and environmental imaging camera.

FIG. 2 schematically illustrates an example HMD 200, worn by a human use 202. HMD 200 is an example of a computing system useable for implementing the camera focus adjustment techniques described herein. It will be understood that HMD 200 is highly simplified and presented only as a non-limiting example. As shown, the HMD includes at least two cameras, including a depth camera 204 and an environmental imaging camera 206.

The depth camera is implemented as any suitable camera system for capturing depth images of a surrounding environment. As non-limiting examples, the depth camera may be implemented as a time-of-flight (TOF) or structured light depth camera, in which the distance between the depth camera and an object in the scene is estimated by emitting illumination from the depth camera, and detecting illumination reflected back to the depth camera by the object. To this end, depth camera 204 is emitting illumination 208, which in some examples includes electromagnetic radiation in or near the infrared spectrum. As one example, the illumination may include short-wave infrared light in the 1.0-2.5 μm wavelength range, in which case the depth camera is a short-wave infrared (SWIR) depth camera. As another example, the illumination may include light in the near-infrared (NIR) wavelength range. In any case, illumination 208 emitted by the depth camera typically does not include light in the visible spectrum, reducing the detectability of HMD 200 to any humans, animals, and/or photosensitive devices in the surrounding environment.

The environmental imaging camera generally takes the form of any suitable camera or array of cameras for capturing images of the surrounding environment. The environmental imaging camera has any suitable imaging properties—e.g., resolution, sensitivity, aperture, image sensor size, and wavelength sensitivity. In some examples, the environmental imaging camera is a visible-light camera configured for use in low-light environments. In such cases, the environmental imaging camera may include a relatively larger aperture and image sensor size, and have a higher light sensitivity, so as to improve the camera performance in low light conditions.

In other examples, the environmental imaging camera is an infrared camera. In such cases, the environmental imaging camera may be sensitive to a different wavelength range from the illumination light emitted by the depth camera—e.g., to prevent the depth camera's illumination pattern from being imaged by the environmental imaging camera.

In the example of FIG. 2, HMD 200 includes a near-eye display 210 useable for presenting imagery to eyes of user 202. For example, as discussed above, images captured by the environmental imaging camera may in some cases be displayed via near-eye display 210—e.g., to improve the user's ability to see their surroundings even in low light conditions. It will be understood that any suitable imagery may be presented via the near-eye display, including computer-generated imagery such as user interface elements, heads-up display information, and/or rendered virtual objects. In some examples, near-eye display 210 is substantially opaque, while in other examples, the near-eye display is at least partially transparent.

FIG. 3 illustrates an example method 300 for camera focus adjustment. Method 300 is primarily described as being performed by an HMD (e.g., computing system 102 of FIG. 1 or HMD 200 of FIG. 2), although this is non-limiting. Rather, steps of method 300 may be performed by any suitable computing system of one or more computing devices—as additional nonlimiting examples, method 300 may be implemented by a mobile computing device such as a smartphone or tablet, an autonomous vehicle computing system, or an autonomous robot. Any computing device implementing steps of method 300 may have any suitable capabilities, form factor, and hardware configuration. Steps of method 300 may be initiated, terminated, and/or repeated, at any suitable time and in response to any suitable trigger. In some examples, method 300 is performed by computing system 1000 described below with respect to FIG. 10.

At 302, method 300 includes receiving a depth image of a surrounding environment captured by a depth camera of the computing system. For example, depth camera 204 of HMD 200 captures a depth image of its surrounding environment for processing by a logic machine of the HMD. The depth image is described as including a plurality of "depth pixels," which each encode depth values corresponding to distances between the depth camera and objects in the surrounding environment. The depth image may also be referred to as a "depth map"—e.g., a data structure including a plurality of data points (e.g., "depth pixels) representing the estimated distances between physical objects in the environment, and an origin reference point (e.g., the depth camera). It will be understood that the depth image takes any suitable form—e.g., the depth image is implemented as any computer data structure, using any suitable formatting and data encoding. It will be understood that the depth image may in some cases include additional data channels beyond depth values for each depth pixel—e.g., in some cases the depth image additionally includes one or more color or luminance channels.

Figure 4A:
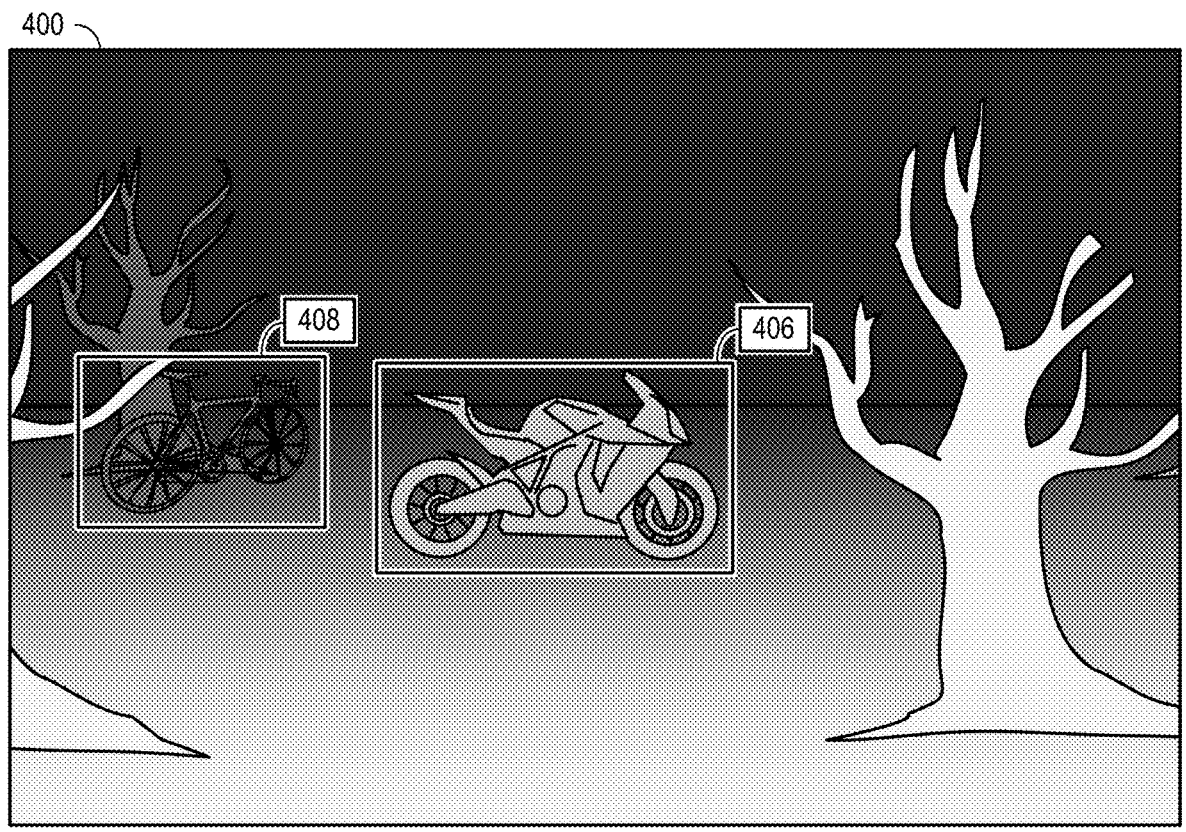
FIGS. 4A and 4B schematically show an example depth image including a plurality of depth pixels.
Figure 4B:
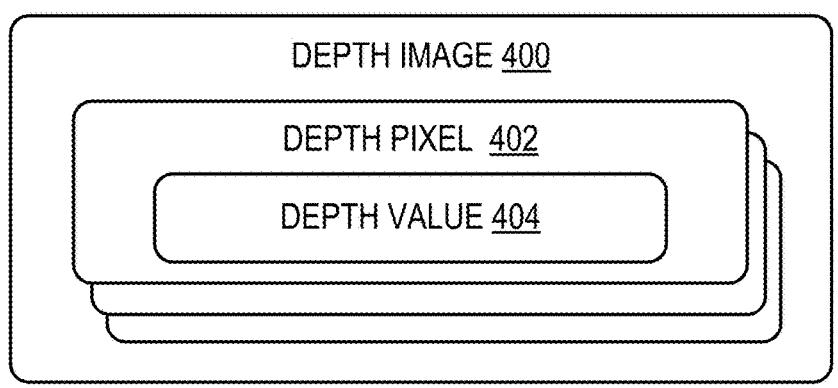

FIGS. 4A and 4B schematically represent an example depth image. Specifically, FIG. 4A shows an example depth image 400 of environment 104 depicted in FIG. 1—e.g., depth image 400 is captured by a depth camera of computing system 102. In the example of FIG. 4A, the depth pixels of the depth image are visually represented with greyscale values, such that pixels with lower depth values (e.g., imaging objects that are relatively closer to the depth camera) use lighter shades of grey, while pixels with higher depth values (e.g., imaging objects that are relatively more distant from the depth camera) use darker shades of grey.

It will be understood that depth image 400 is graphically represented in FIG. 4A for the sake of explanation only. A depth image as described herein need not be visually represented or displayed in any manner. Rather, as discussed above, a depth image takes the form of any suitable computer data structure that includes a plurality of data points (e.g., depth pixels) each encoding depth values. For example, FIG. 4B shows a different schematic representation of depth image 400, including a plurality of depth pixels 402, and each depth pixel encoding a corresponding depth value 404. While the depth image may in some cases be visually rendered for display such as is shown in FIG. 4A, this is not necessary.

Returning briefly to FIG. 3, at 304, method 300 includes identifying one or more depth pixels of the depth image as a region-of-interest (ROI). This is also schematically illustrated with respect to FIG. 4A. Depth pixels of depth image 400 corresponding to the motorcycle 106 of FIG. 1 are identified as an ROI 406. In this example, the ROI has a rectangular shape that encloses an identified object of interest—e.g., the motorcycle. It will be understood, however, that an ROI may have any suitable size and shape, and may include any suitable number of depth pixels of the depth image.

Furthermore, it will be understood that in some examples, more than one ROI may be identified in the same depth image. For example, in FIG. 4A, a second ROI 408 is also identified, corresponding to the bicycle 108 of FIG. 1. In general, any suitable number of ROIs may be identified in the same depth image.

Any suitable technique is used for identifying one or more pixels of a depth image as an ROI. In one non-limiting example, the one or more depth pixels are identified as the ROI based at least in part on determining that the one or more depth pixels correspond to a gaze vector of a human user, where the gaze vector is received from a gaze detection system of the computing system. As such, at 306, method 300 optionally includes identifying the ROI based on a gaze vector of a human user.

Figure 5:
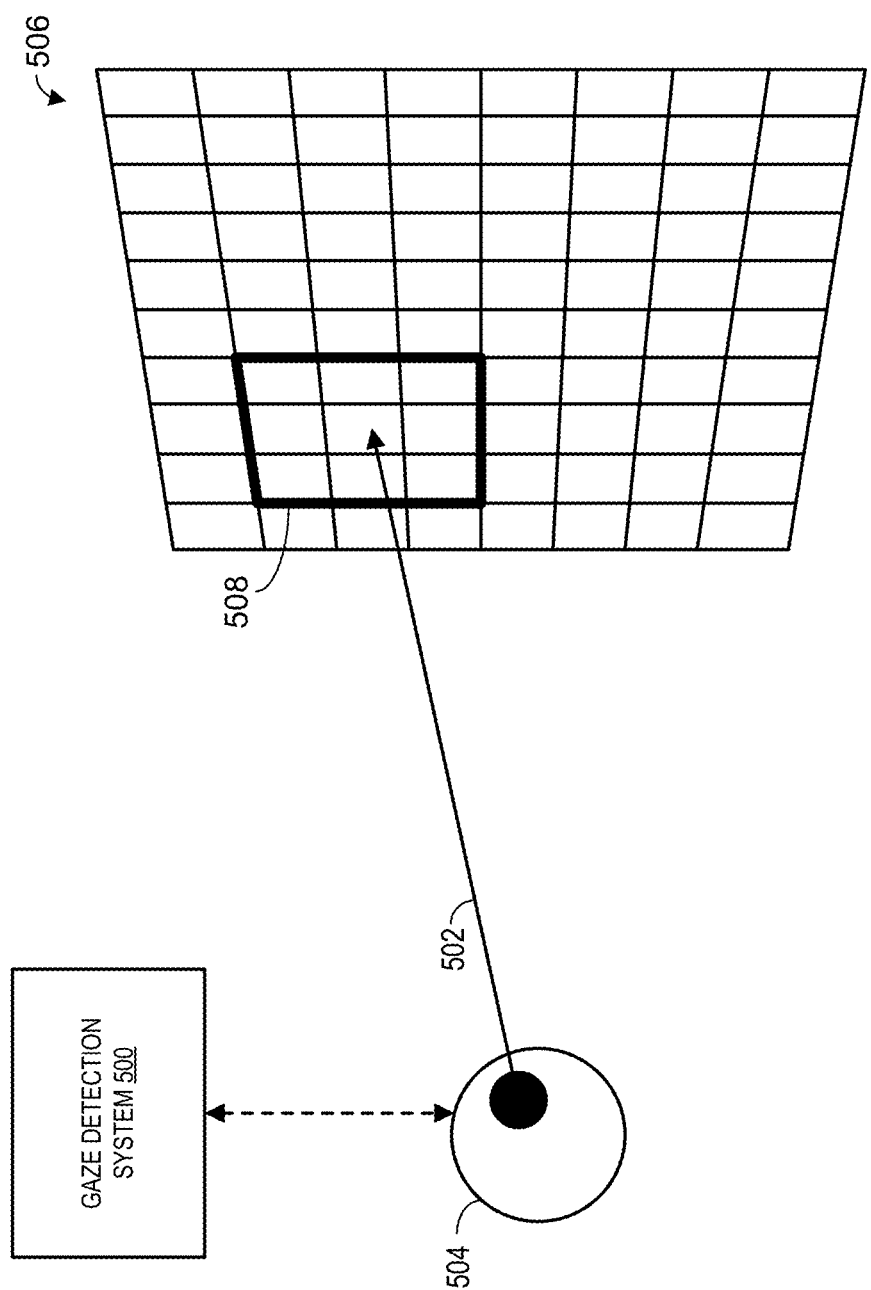
FIG. 5 schematically illustrates identifying a portion of a depth image corresponding to a user eye gaze vector.

This is schematically illustrated with respect to FIG. 5, showing an example gaze detection system 500. The gaze detection system estimates a gaze vector 502 of a user eye 504. Based on a known physical arrangement of the gaze detection system and the depth camera, the gaze vector output by the gaze detection system is mapped to the pixel coordinate space of a depth image 506. The pixels of the depth image representing the portion of the environment that the user's gaze is directed toward are identified as an ROI 508.

In other words, the gaze detection system outputs an estimate of the user's current gaze vector relative to any suitable coordinate system—e.g., relative to a vector coordinate system of the gaze detection system. The gaze detection system and depth camera typically each have fixed positions relative to a common device housing of the computing system. Thus, a mapping can be developed that relates any particular gaze vector output by the gaze detection system, to one or more pixels of the depth image that image a portion of the environment toward which the user's gaze is currently directed. Such a mapping may be developed at any suitable time and in any suitable manner—e.g., the mapping may be developed by a manufacturer of the computing system, and/or developed by an end user via a calibration routine. In this manner, the computing system determines the pixels of the depth image that correspond to the gaze vector of the human user—e.g., based on a mapping that relates different gaze vectors to different pixel coordinates of the depth image that depict the portion of the surrounding environment toward which the user is gazing.

The gaze detection system is implemented in any suitable way. As one non-limiting example, the gaze detection system is configured to illuminate the user eye (e.g., using infrared light) and detect changes in reflection of the light as the user eye moves. The detected reflections may include corneal reflections, and/or reflections from any other anatomical features of the eye—e.g., such as retinal blood vessels, and/or reflections from the back of the eye lens. In this manner, the gaze detection system relates different profiles of detected reflections from the eye, to different rotational vectors of the eye, and thereby estimates the eye's current gaze vector.

As another example approach, the ROI may be detected after performing object recognition to detect presence of an object of interest in the surrounding environment. Returning briefly to FIG. 3, at 308, method 300 optionally includes identifying the ROI by detecting an object of interest in an environmental image of the surrounding environment. More particularly, an object of interest is detected in the environmental image at a pixel-space position relative to the pixel coordinate system of the environmental image. Based on a known spatial relationship between the environmental imaging camera and the depth camera, the pixel-space position of the object of interest can be mapped to one or more depth pixels of the depth image, which are then identified as the ROI. In other words, the one or more depth pixels are identified as the ROI based at least in part on determining that a pixel-space position of the object of interest in the environmental image corresponds to the one or more depth pixels in the depth image.

Figure 6:
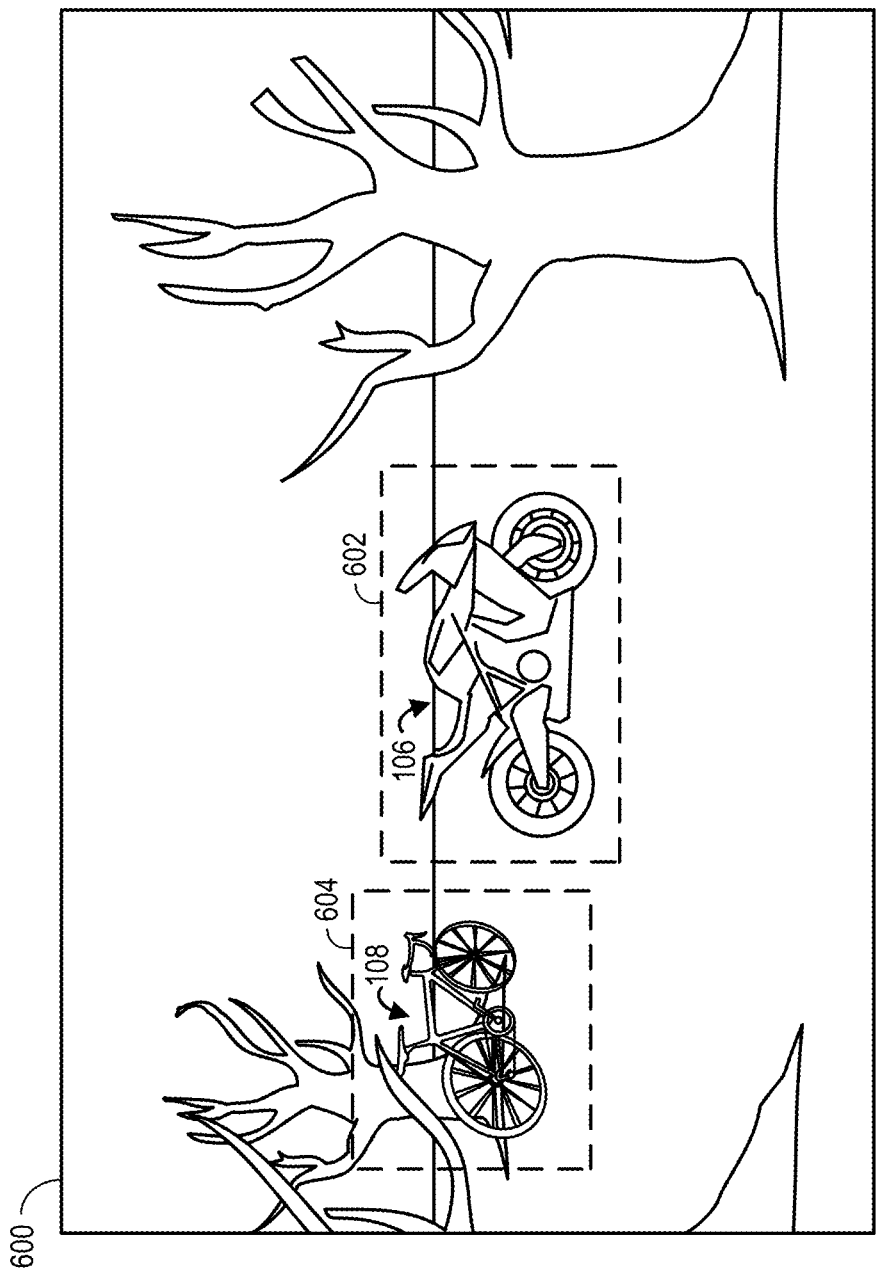
FIG. 6 schematically shows an example environmental image captured by an environmental imaging camera.

This is schematically illustrated with respect to FIG. 6, showing an example environmental image 600. Specifically, image 600 depicts environment 104 of FIG. 1, as captured by an environmental imaging camera of computing system 102. Notably, in the example of FIG. 6, the environmental image is presented as though substantially the entire scene is in focus. This is done only for the sake of visual clarity. It will be understood that, in some cases, the environmental image used for object detection is captured before the focus of the camera is adjusted based on an identified ROI, and thus some to all of the captured environmental image may be at least partially blurred.

The environmental image is primarily described herein as being a single image captured at a particular moment in time. However, in some examples, the environmental image is a hybrid image generated based on a plurality of different individual images captured on different time frames. This may be done to improve the signal-to-noise (SNR) of the image, particularly in low-light environments where image SNR may be relatively low.

In any case, in the example of FIG. 6, the computing system has identified motorcycle 106 as an object of interest, indicated by the bounding box 602 shown surrounding motorcycle 106. In this example, bicycle 108 is identified as a second object of interest, as indicated by the bounding box 604 shown surrounding the bicycle.

In other words, specific pixels within environmental image 600 are identified as corresponding to objects of interest having specific pixel-space positions within the image. These pixel-space positions are then mapped to corresponding pixel-space positions within the depth image captured by the depth camera. This is done based on a known spatial relationship between the environmental imaging camera and the depth camera. In some examples, the environmental imaging camera and depth camera have fixed positions relative to the housing of the computing system (e.g., HMD), and have overlapping fields-of-view of the surrounding environment. In this manner, a mapping can be generated that correlates any particular pixel position within an image captured by the environmental imaging camera, to a corresponding pixel position within a depth image captured by the depth camera. Such a mapping may be developed at any suitable time—e.g., it may be generated by a manufacturer of the computing system, or it may be generated by the user by following a calibration routine.

It will be understood that any suitable image-based object recognition (e.g., computer vision) techniques may be used to identify objects of interest in an environmental image. In some examples, suitable machine learning (ML) and/or artificial intelligence (AI) techniques are used. As one non-limiting example, object recognition may be performed using a machine learning-trained classifier, which is trained to receive image pixel data as an input, and output indications of pixels within the image classified as corresponding to one or more objects of interest. Any suitable training process may be used—e.g., the classifier may be trained on a training set of input images that are manually labelled by human annotators. Additional non-limiting examples of suitable ML and/or AI techniques will be described below with respect to FIG. 10.

In any case, the computing system identifies one or more depth pixels of the depth image as an ROI, whether via gaze detection, object recognition, and/or another suitable technique. In some examples, based on the identified position of the ROI, the computing system changes one or more aspects of the illumination emitted by the depth camera—e.g., to improve tracking objects imaged by the depth image, to conserve power, and/or to reduce visibility of the computing system.

As one example, after identifying the one or more depth pixels as the ROI, the computing system adjusts an active illumination emitted by the depth camera (e.g., illumination 208 shown in FIG. 2) to reduce active illumination of objects in the surrounding environment not imaged by the one or more depth pixels, while still actively illuminating an object in the surrounding environment imaged by the one or more depth pixels. This beneficially reduces power consumption of the computing system, and may reduce detectability of the active illumination emitted by the depth camera, while still providing accurate data relating to the distance between the depth camera and the portion of the environment imaged by the ROI.

Additionally, or alternatively, after identifying the one or more depth pixels as the ROI, the computing system adjusts the active illumination emitted by the depth camera to increase active illumination of an object in the surrounding environment imaged by the one or more depth pixels. This can beneficially improve the accuracy with which the focus of the environmental imaging camera is adjusted, by improving the accuracy with which the computing system detects the distance between the depth camera and the imaged object.

In any case, upon identifying the one or more depth pixels of the depth image as the ROI, the computing system adjusts a focus of the environmental imaging camera. Returning briefly to FIG. 3, at 310, method 300 includes adjusting the focus of the environmental imaging camera based at least in part on depth values corresponding to the one or more depth pixels identified as the ROI. In general, this includes adjusting a position of a lens of the depth camera by an amount corresponding to the distance between the depth camera and the portions of the environment imaged by the ROI, as indicated by the depth values corresponding to the depth pixels identified as the ROI.

Camera focus adjustment is schematically illustrated with respect to FIGS. 7A and 7B. It will be understood that FIGS. 7A and 7B are highly simplified and are provided only for the sake of illustration. FIG. 7A shows an example lens 700, which focuses light 702 reflected by an object 704 onto an image sensor 706. FIG. 7A depicts a scenario where the object is relatively close to the lens. In FIG. 7B, the camera is focused on a second object 708 that is relatively further away from the lens. As such, the lens has been moved to a different position to change the focus level provided by the camera system based on the distance between the camera and the second object.

The specific amount by which the lens is moved is in some cases determined by a camera calibration that maps distance ranges between the camera and focus target (e.g., as given by the depth values of the ROI depth pixels), to different positions of the lens within its housing, corresponding to different focus levels of the camera. In some cases, this is done based on a preexisting camera calibration that maps different distance ranges to different focus levels— e.g., the preexisting calibration may be generated by a manufacturer of the computing system.

In some examples, the camera calibration is adjustable over time—e.g., to account for changes in lens performance caused by wear-and-tear and/or changes in environmental conditions, such as temperature. For instance, the camera calibration may be changed automatically by evaluating contrast levels in images captured after focus adjustment, and/or changed manually by a human user after deciding that the current calibration is not providing sufficiently focused images.

Returning briefly to FIG. 3, at 312, method 300 optionally includes, after adjusting the focus of the environmental imaging camera, receiving an environmental image of the surrounding environment captured by the environmental imaging camera, and displaying the environmental image. For example, the environmental imaging camera may capture an environmental image such as image 600, shown in FIG. 6, after the focus of the camera is adjusted. In some examples, the environmental image is then be displayed in any suitable manner—e.g., via a near-eye display of the computing system to improve the user's view of the surrounding environment—and/or by another suitable display device.

The present disclosure has thus far focused primarily on adjusting the focus of the environmental imaging camera based on one ROI. However, as discussed above with respect to FIGS. 4A and 6, the computing system may in some cases identify two or more ROIs in the same depth image—e.g., in FIG. 4A, ROIs are identified for motorcycle 106 and bicycle 108. In other words, in some examples, a second one or more depth pixels of the depth image are identified as a second ROI, and the focus of the environmental imaging camera is adjusted based at least in part on the depth values of the second one or more depth pixels. Using the example of FIG. 4A, the focus of the environmental imaging camera may be adjusted based on the depth values for the depth pixels identified as first ROI 406 and second ROI 408. The following discussion will primarily focus on scenarios where two ROIs are identified, although it will be understood that this is non-limiting—rather, any suitable number of ROIs may be identified in any given depth image.

In cases where multiple ROIs are identified, the focus of the environmental imaging camera may be adjusted in various suitable ways. In one non-limiting example, the focus of the environmental imaging camera is set to an intermediary focus level corresponding to a distance range that is between the depth values of the one or more depth pixels of the first ROI, and the second one or more depth pixels of the second ROI. In one example, the focus level depicted in FIG. 7A corresponds to a distance range determined for a first ROI, while the focus level depicted in FIG. 7B corresponds to a distance range determined for a second ROI. In order to keep both the first ROI and the second ROI approximately in focus at the same time, an intermediate focus level between those depicted in FIGS. 7A and 7B may be used.

In another example, the focus of the environmental imaging camera is set based on whichever of the first ROI or the second ROI is selected by a human user. Specifically, in some examples, the computing system displays an environmental image of the surrounding environment captured by the environmental imaging camera, and superimposes a first bounding box and a second bounding box over pixels of the environmental image corresponding to the ROI and the second ROI. For example, in FIG. 6, bounding boxes are shown around pixels of the environmental image corresponding to different ROIs, for the motorcycle 106 and bicycle 108 identified as objects of interest. Upon displaying such an image, the computing system in some examples receives a user input specifying either the first ROI or the second ROI as their desired focus target. The focus of the environmental imaging camera may then be set either to a first focus level for the first ROI, or a second focus level for the second ROI, according to the user input.

In another example, the focus of the environmental imaging camera is dynamically switched between a first focus level for the first ROI and a second focus level for the second ROI. In some cases, this is done by tracking changes in the user's gaze direction—e.g., upon detecting that the user's gaze has moved from the first ROI to a second ROI, the focus of the environmental imaging camera may be correspondingly adjusted to a focus level for the second ROI. In some examples, the focus is not adjusted immediately upon detecting a change in the user's gaze, as overly frequent changes in focus may be distracting. As such, in some examples, determining when to adjust the focus of the ROI is done based on one or more adjustment criteria. Non-limiting examples of adjustment criteria include a length of time since the user's gaze direction changed, and a length of time that the user's gaze direction was focused on a prior ROI. For example, if the user was gazing toward a first ROI for a relatively long time, and then a second ROI is identified based on a change in the user's gaze vector, it is possible that the user is still interested in the first ROI, and the second ROI is merely a temporary distraction. As such, it may be desirable to avoid adjusting the focus of the environmental imaging camera until the user's gaze is directed toward the second ROI for at least a threshold amount of time.

In another example, the computing system includes two or more different environmental imaging cameras, which can be set to different focus levels at the same time. In other words, in some examples, a first environmental imaging camera is set to a first focus level for a first ROI, while a second environmental imaging camera is set to a second focus level for a second ROI. Corresponding first and second environmental images captured by the two environmental imaging cameras are then displayed, either sequentially or simultaneously. For example, in some cases the computing system switches between displaying images captured by the first and second cameras automatically (e.g., after time has passed, after detecting a change in the user's gaze vector, after detecting movement at one ROI or the other), and/or in response to user input (e.g., the user may toggle between images captured by the two environmental imaging cameras depending on the ROI they are currently interested in). Alternatively, images captured by each of the two environmental imaging cameras are in some cases displayed simultaneously—e.g., in separate near-eye displays corresponding to each of the user's eyes.

In another example, software-based deblurring methods are used to generate a version of the environmental image in which portions of the environment corresponding to both the first ROI and second ROI are in focus. FIG. 8 illustrates one example method 800 for such deblurring. Specifically, at 802, method 800 includes receiving an environmental image captured while the environmental imaging camera is set to a first focus level for a first ROI. In other words, a first ROI is identified as described above, and an environmental image is captured after the focus of the environmental imaging camera is adjusted based on depth values corresponding to the first ROI. A second ROI is also identified in the same depth image.

At 804, method 800 includes deblurring a portion of the environmental image corresponding to the second ROI. This is done based at least in part on the depth values of the second one or more depth pixels identified as the second ROI, and a known point spread function (PSF) of the environmental imaging camera, using suitable image super resolution techniques. In other words, based on known imaging properties of the camera, and a known distance between the camera and the second ROI, a suitable super resolution algorithm can be used to at least partially deblur the portion of the environmental image corresponding to the second ROI, while the portion of the environmental image corresponding to the first ROI remains in focus. In some cases, image deblurring is done using suitable ML and/or AI techniques, such as a convolutional neural network, as will be described in more detail below with respect to FIG. 10. After the image is deblurred, then at 806, method 800 includes displaying the image.

Figure 9:
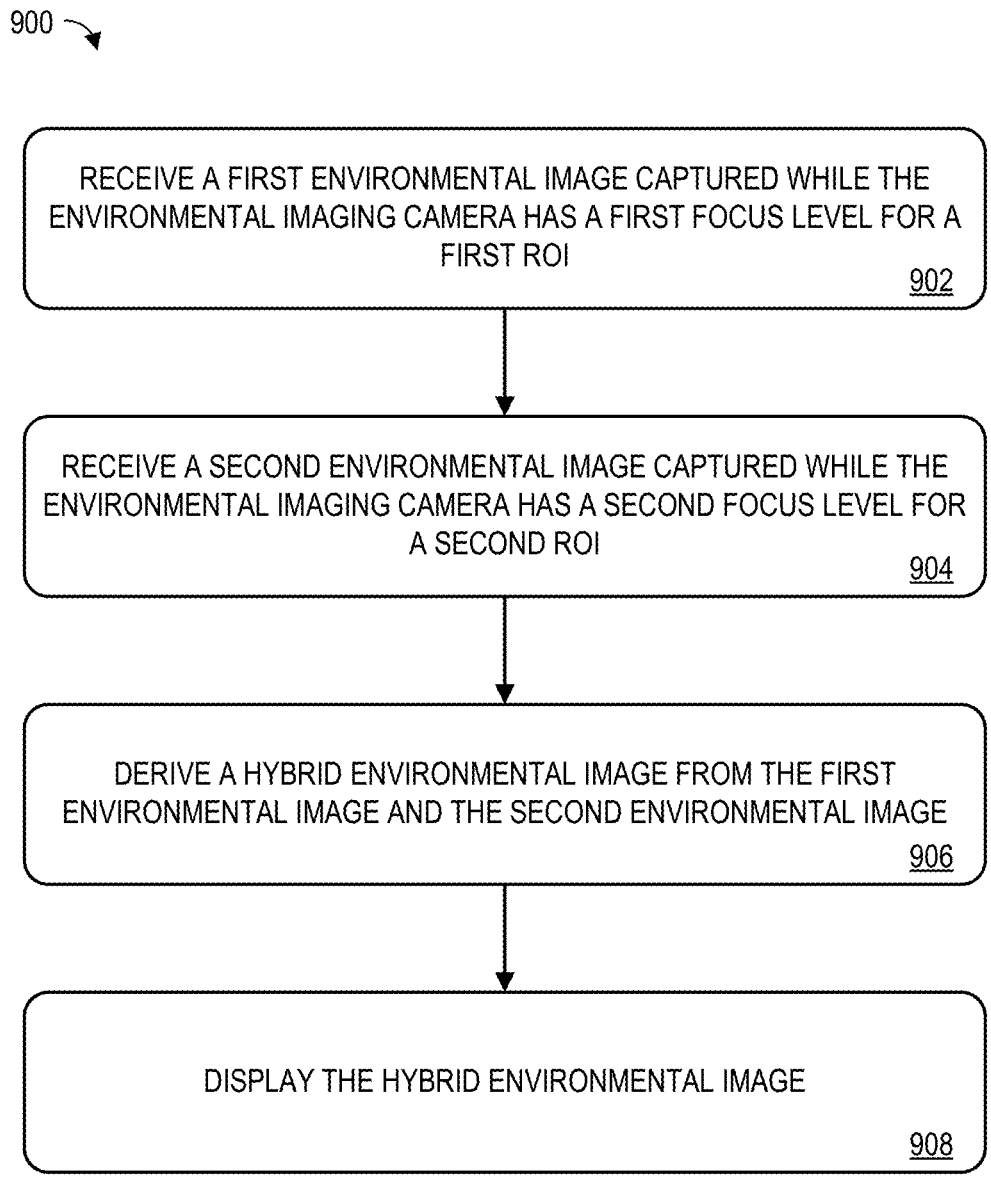
FIG. 9 illustrates another example method for camera focus adjustment in which two ROIs are detected.

In another example, the environmental image is a hybrid image generated based on multiple different images captured at different times—e.g., while the environmental imaging camera is set to different focus levels for different ROIs. FIG. 9 illustrates an example method 900 for generating such a hybrid image. Specifically, at 902, method 900 includes receiving a first environmental image of a surrounding environment captured with the environmental imaging camera has a first focus level for a first ROI. At 904, method 900 includes receiving a second environmental image of a surrounding environment captured with the environmental imaging camera has a second focus level for a second ROI. Any suitable length of time may pass between capture of the first and second environmental images, although greater lengths of time between capture of the two images increases the likelihood that the environment changes significantly between capture of the two images, and/or a viewpoint of the camera changes (e.g., due to movement of a human user).

At 906, method 900 includes deriving a hybrid environmental image from the first environmental image and the second environmental image. In various examples, this is done in any suitable way, using any suitable image processing techniques for combining, merging, or otherwise blending two similar images. When differences between pixels of the first image and second image are detected, the computing system in some examples defaults to including the pixels of whichever image has a higher contrast at that pixel-space location, which causes the resulting hybrid environmental image to include the in-focus regions of each of the first and second environmental images.

It will be understood that the images used to generate the hybrid environmental image need not be equally divided between each of the detected ROIs. In other words, while capturing images of the surrounding environment at different focus levels for different identified ROIs, the computing system in some examples uses a sweep pattern that prioritizes some ROIs over others. As such, the hybrid environmental image is in some cases generated based on relatively more images that are focused based on a first ROI, and relatively fewer images that are focused based on one or more other ROIs. For example, relatively more images may be captured having a focus level set based on an ROI that a user spends more time gazing toward, based on a user gaze vector output by a gaze detection system. Additionally, or alternatively, when multiple ROIs are detected having similar depth values (e.g., imaging portions of the environment having relatively similar distances away from the depth camera), then the sweep pattern may prioritize capturing images focused for those ROIs, and capture relatively fewer images focused for ROIs associated with relatively less similar depth values.

In any case, after the hybrid environmental image is generated, then at 908, method 900 includes displaying the hybrid environmental image. In this manner, the displayed image is beneficially focused on multiple portions of the environment simultaneously. This provides the benefit of improving human-computer interaction, by providing a computerized method by which the user can more clearly perceive their surroundings even in low-light environments, and without significantly increasing their own visibility—e.g., without requiring the user to emit visible illumination light.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
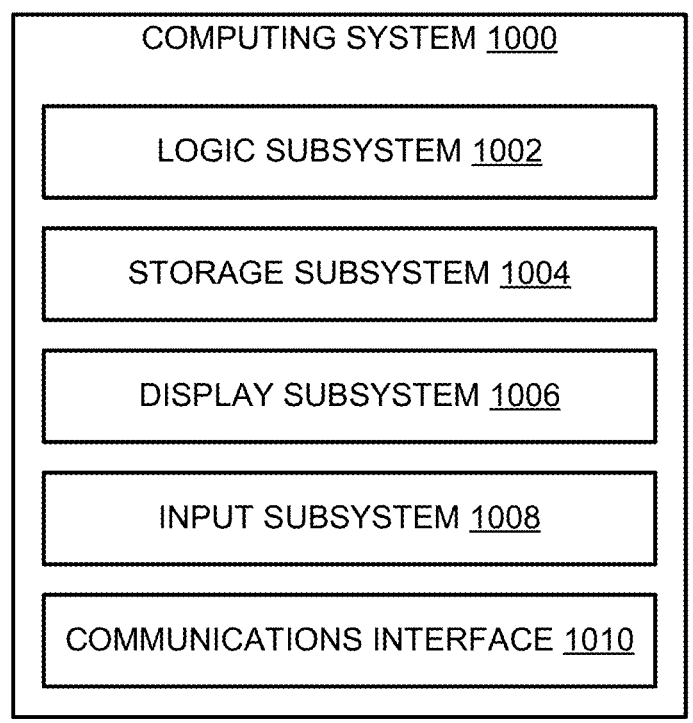
FIG. 10 schematically shows an example computing system.

FIG. 10 schematically shows a simplified representation of a computing system 1000 configured to provide any to all of the compute functionality described herein. Computing system 1000 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 10.

Logic subsystem 1002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1006 may be used to present a visual representation of data held by storage subsystem 1004. This visual representation may take the form of a graphical user interface (GUI). Display subsystem 1006 may include one or more display devices utilizing virtually any type of technology. In some implementations, display subsystem may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for camera focus adjustment comprises: at a computing system, receiving a depth image of a surrounding environment captured by a depth camera of the computing system, the depth image including a plurality of depth pixels, and the plurality of depth pixels each encoding depth values corresponding to distances between the depth camera and objects in the surrounding environment; identifying one or more depth pixels of the plurality of depth pixels as a region-of-interest (ROI); and adjusting a focus of an environmental imaging camera of the computing system based at least in part on the depth values of the one or more depth pixels. In this example or any other example, the one or more depth pixels are identified as the ROI based at least in part on determining that the one or more depth pixels correspond to a gaze vector of a human user, the gaze vector received from a gaze detection system of the computing system. In this example or any other example, the method further comprises receiving an environmental image of the surrounding environment captured by the environmental imaging camera, and detecting an object of interest in the environmental image, and wherein the one or more depth pixels are identified as the ROI based at least in part on determining that a pixel-space position of the object of interest in the environmental image corresponds to the one or more depth pixels in the depth image. In this example or any other example, the method further comprises, after adjusting the focus of the environmental imaging camera, receiving an environmental image of the surrounding environment captured by the environmental imaging camera, and displaying the environmental image. In this example or any other example, the method further comprises, after identifying the one or more depth pixels as the ROI, adjusting an active illumination emitted by the depth camera to reduce active illumination of objects in the surrounding environment not imaged by the one or more depth pixels, while still actively illuminating an object in the surrounding environment imaged by the one or more depth pixels. In this example or any other example, the method further comprises, after identifying the one or more depth pixels as the ROI, adjusting an active illumination emitted by the depth camera to increase active illumination of an object in the surrounding environment imaged by the one or more depth pixels. In this example or any other example, the method further comprises identifying a second one or more depth pixels of the plurality of depth pixels as a second ROI, and adjusting the focus of the environmental imaging camera based at least on in part on the depth values of the second one or more depth pixels. In this example or any other example, the focus of the environmental imaging camera is set to an intermediary focus level corresponding to a distance range that is between the depth values of the one or more depth pixels and the depth values of the second one or more depth pixels. In this example or any other example, the method further comprises displaying an environmental image of the surrounding environment captured by the environmental imaging camera, and superimposing a first bounding box and a second bounding box over pixels of the environmental image corresponding to the ROI and the second ROI. In this example or any other example, the method further comprises receiving a user input specifying either the ROI or the second ROI, and wherein the focus of the environmental imaging camera is set to either a first focus level for the ROI or a second focus level for the second ROI according to the user input. In this example or any other example, the method further comprises receiving an environmental image of the surrounding environment captured by the environmental imaging camera while the environmental imaging camera is set to a first focus level for the ROI, deblurring a portion of the environmental image corresponding to the second ROI based at least in part on the depth values of the second one or more depth pixels and a point spread function of the environmental imaging camera, and displaying the environmental image. In this example or any other example, the method further comprises receiving a first environmental image of the surrounding environment captured by the environmental imaging camera while the environmental imaging camera is set to a first focus level for the ROI, receiving a second environmental image of the surrounding environment captured by the environmental imaging camera while the environmental imaging camera is set to a second focus level for the second ROI, deriving a hybrid environmental image from the first environmental image and the second environmental image, and displaying the hybrid environmental image. In this example or any other example, the focus of the environmental imaging camera is adjusted based on a preexisting camera calibration that maps different distance ranges to different focus levels. In this example or any other example, the environmental imaging camera is a visible light camera configured for use in low-light environments. In this example or any other example, the environmental imaging camera is an infrared camera. In this example or any other example, the depth camera is a short-wave infrared (SWIR) depth camera.

In an example, a head-mounted display device (HMD) comprises: an environmental imaging camera; a depth camera; a logic subsystem; and a storage subsystem holding instructions executable by a logic subsystem to: receive a depth image of a surrounding environment captured by the depth camera, the depth image including a plurality of depth pixels, and the plurality of depth pixels each encoding depth values corresponding to distances between the depth camera and objects in the surrounding environment; identify one or more depth pixels of the plurality of depth pixels as a region-of-interest (ROI); and adjust a focus of the environmental imaging camera based at least in part on the depth values of the one or more depth pixels. In this example or any other example, the one or more depth pixels are identified as the ROI based at least in part on determining that the one or more depth pixels correspond to a gaze vector of a human user, the gaze vector received from a gaze detection system of the HMD. In this example or any other example, the instructions are further executable to receive an environmental image of the surrounding environment captured by the environmental imaging camera, and detect an object of interest in the environmental image, and wherein the one or more depth pixels are identified as the ROI based at least in part on determining that a pixel-space position of the object of interest in the environmental image corresponds to the one or more depth pixels in the depth image.

In an example, a method for camera focus adjustment comprises: at a head-mounted display device (HMD), receiving an environmental image of a surrounding environment captured by an environmental imaging camera of the HMD; detecting an object of interest at a pixel-space position in the environmental image; receiving a depth image of the surrounding environment captured by a depth camera of the HMD, the depth image including a plurality of depth pixels, and the plurality of depth pixels each encoding depth values corresponding to distances between the depth camera and objects in the surrounding environment; identifying one or more depth pixels of the plurality of depth pixels as a region-of-interest based at least in part on determining that the pixel-space position of the object of interest in the environmental image corresponds to the one or more depth pixels in the depth image; and adjusting a focus of the environmental imaging camera based at least in part on the depth values of the one or more depth pixels.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for camera focus adjustment, the method comprising:
    at a computing system, receiving a depth image of a surrounding environment captured by a depth camera of the computing system, the depth image including a plurality of depth pixels, and the plurality of depth pixels each encoding depth values corresponding to distances between the depth camera and objects in the surrounding environment;
    identifying one or more depth pixels of the plurality of depth pixels as a region-of-interest (ROI); and
    adjusting a focus of an environmental imaging camera of the computing system based at least in part on the depth values of the one or more depth pixels.

2. The method of claim 1, wherein the one or more depth pixels are identified as the ROI based at least in part on determining that the one or more depth pixels correspond to a gaze vector of a human user, the gaze vector received from a gaze detection system of the computing system.

3. The method of claim 1, further comprising receiving an environmental image of the surrounding environment captured by the environmental imaging camera, and detecting an object of interest in the environmental image, and wherein the one or more depth pixels are identified as the ROI based at least in part on determining that a pixel-space position of the object of interest in the environmental image corresponds to the one or more depth pixels in the depth image.

4. The method of claim 1, further comprising, after adjusting the focus of the environmental imaging camera, receiving an environmental image of the surrounding environment captured by the environmental imaging camera, and displaying the environmental image.

5. The method of claim 1, further comprising, after identifying the one or more depth pixels as the ROI, adjusting an active illumination emitted by the depth camera to reduce active illumination of objects in the surrounding environment not imaged by the one or more depth pixels, while still actively illuminating an object in the surrounding environment imaged by the one or more depth pixels.

6. The method of claim 1, further comprising, after identifying the one or more depth pixels as the ROI, adjusting an active illumination emitted by the depth camera to increase active illumination of an object in the surrounding environment imaged by the one or more depth pixels.

7. The method of claim 1, further comprising identifying a second one or more depth pixels of the plurality of depth pixels as a second ROI, and adjusting the focus of the environmental imaging camera based at least on in part on the depth values of the second one or more depth pixels.

8. The method of claim 7, wherein the focus of the environmental imaging camera is set to an intermediary focus level corresponding to a distance range that is between the depth values of the one or more depth pixels and the depth values of the second one or more depth pixels.

9. The method of claim 7, further comprising displaying an environmental image of the surrounding environment captured by the environmental imaging camera, and superimposing a first bounding box and a second bounding box over pixels of the environmental image corresponding to the ROI and the second ROI.

10. The method of claim 9, further comprising receiving a user input specifying either the ROI or the second ROI, and wherein the focus of the environmental imaging camera is set to either a first focus level for the ROI or a second focus level for the second ROI according to the user input.

11. The method of claim 7, further comprising receiving an environmental image of the surrounding environment captured by the environmental imaging camera while the environmental imaging camera is set to a first focus level for the ROI, deblurring a portion of the environmental image corresponding to the second ROI based at least in part on the depth values of the second one or more depth pixels and a point spread function of the environmental imaging camera, and displaying the environmental image.

12. The method of claim 7, further comprising receiving a first environmental image of the surrounding environment captured by the environmental imaging camera while the environmental imaging camera is set to a first focus level for the ROI, receiving a second environmental image of the surrounding environment captured by the environmental imaging camera while the environmental imaging camera is set to a second focus level for the second ROI, deriving a hybrid environmental image from the first environmental image and the second environmental image, and displaying the hybrid environmental image.

13. The method of claim 1, wherein the focus of the environmental imaging camera is adjusted based on a pre-existing camera calibration that maps different distance ranges to different focus levels.

14. The method of claim 1, wherein the environmental imaging camera is a visible light camera configured for use in low-light environments.

15. The method of claim 1, wherein the environmental imaging camera is an infrared camera.

16. The method of claim 1, wherein the depth camera is a short-wave infrared (SWIR) depth camera.

17. A head-mounted display device (HMD), comprising:
an environmental imaging camera;
a depth camera;
a logic subsystem; and
a storage subsystem holding instructions executable by the logic subsystem to:
  receive a depth image of a surrounding environment captured by the depth camera, the depth image including a plurality of depth pixels, and the plurality of depth pixels each encoding depth values corresponding to distances between the depth camera and objects in the surrounding environment;
  identify one or more depth pixels of the plurality of depth pixels as a region-of-interest (ROI); and
  adjust a focus of the environmental imaging camera based at least in part on the depth values of the one or more depth pixels.

18. The HMD of claim 17, wherein the one or more depth pixels are identified as the ROI based at least in part on determining that the one or more depth pixels correspond to a gaze vector of a human user, the gaze vector received from a gaze detection system of the HMD.

19. The HMD of claim 17, wherein the instructions are further executable to receive an environmental image of the surrounding environment captured by the environmental imaging camera, and detect an object of interest in the environmental image, and wherein the one or more depth pixels are identified as the ROI based at least in part on determining that a pixel-space position of the object of interest in the environmental image corresponds to the one or more depth pixels in the depth image.

20. A method for camera focus adjustment, the method comprising:
at a head-mounted display device (HMD), receiving an environmental image of a surrounding environment captured by an environmental imaging camera of the HMD;
detecting an object of interest at a pixel-space position in the environmental image;
receiving a depth image of the surrounding environment captured by a depth camera of the HMD, the depth image including a plurality of depth pixels, and the plurality of depth pixels each encoding depth values corresponding to distances between the depth camera and objects in the surrounding environment;
identifying one or more depth pixels of the plurality of depth pixels as a region-of-interest based at least in part on determining that the pixel-space position of the object of interest in the environmental image corresponds to the one or more depth pixels in the depth image; and
adjusting a focus of the environmental imaging camera based at least in part on the depth values of the one or more depth pixels.

* * * * *